Dec. 18, 1956   E. STUMP   2,774,451
SHIFTABLE CLUTCH IN CHANGE SPEED TRANSMISSION
Filed Oct. 28, 1950
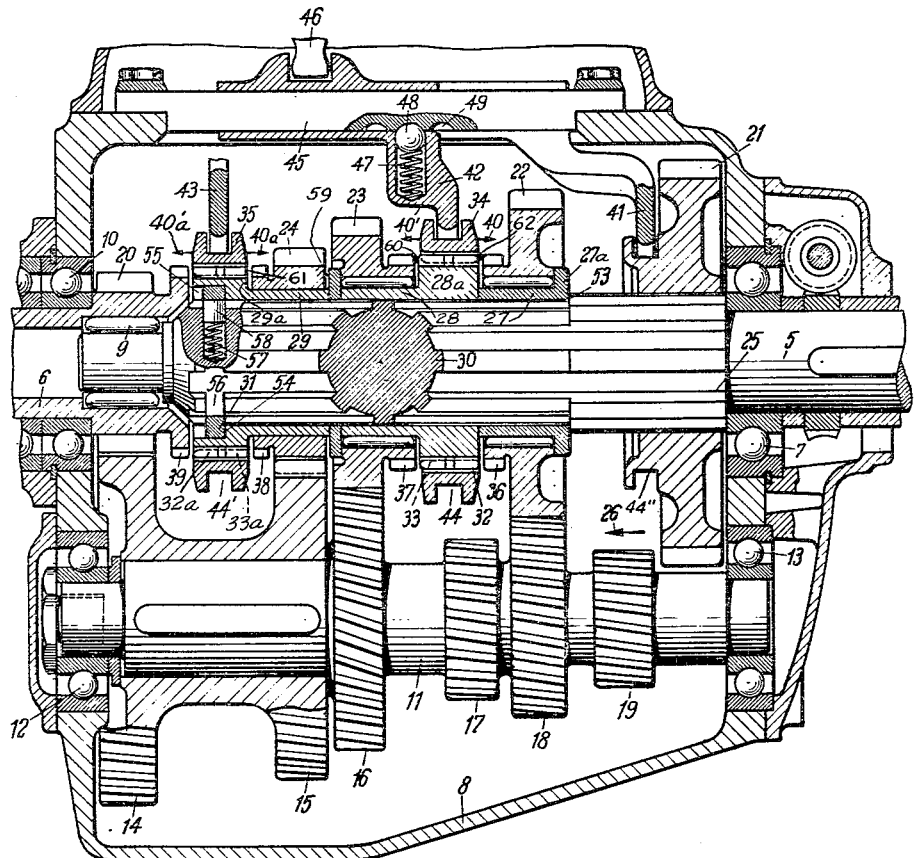
Fig. 1
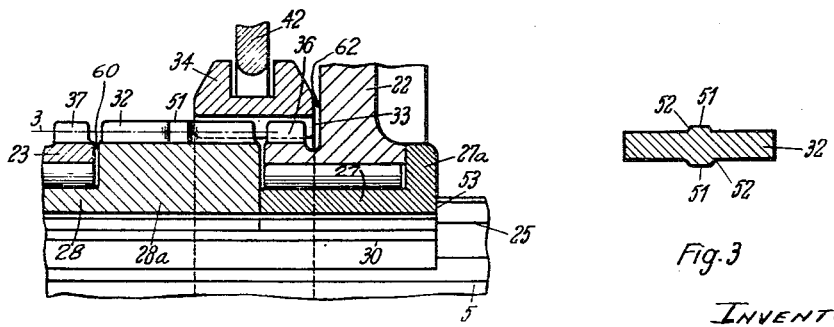
Fig. 2
Fig. 3
INVENTOR
EUGEN STUMP
By Haseltine, Lake & Co.
AGENTS

United States Patent Office 2,774,451
Patented Dec. 18, 1956

2,774,451

SHIFTABLE CLUTCH IN CHANGE SPEED TRANSMISSION

Eugen Stump, Stuttgart-Unterturkheim, Germany, assignor to Daimler-Benz Aktiengesellschaft, Stuttgart-Unterturkheim, Germany Application October 28, 1950, Serial No. 192,690

Claims priority, application Germany October 31, 1949

6 Claims. (Cl. 192—48)

This invention relates to a speed change transmission, particularly for motor vehicles, and preferably to transmissions of the type including helical gears rotatably mounted on a shaft or shafts and adapted to be connected therewith for common rotation by toothed clutches for the transfer of considerable power.

It is an object of the present invention to provide means which will hold the engaging gears from accidentally "walking out." This object of the invention is attained by the provision of an externally splined clutch member with a widened portion providing for shoulders on the side faces of the splines, said shoulders forming axial stops for the engaging splines or teeth of the co-operating internally splined clutch member, said splines preferably extending parallel to the axis. In a preferred embodiment of the invention a central section of each spline of the externally splined clutch member constitutes such widened portion, but the invention is in no way limited to such arrangement since the widened portion may be disposed at a point other than between the ends of the spline.

The widened portion of each spline may project from the side faces thereof an amount of a fraction of one millimeter, for instance from 0.2 to 0.3 millimeter, and the shoulders formed by such widened portion may be so curved as to provide for a smooth transition between the shoulders and the side faces of the splines.

It is a further object of the invention to provide a transmission in which the axial thrust exerted by the helical teeth on the gears will be taken up in a reliable and simple manner by suitable means. This object is attained by the provision of sleeves fixed to the shaft and carrying the helical gears rotatably journalled thereon with collars providing shoulders for engagement by the gears, the latter being preferably adapted to be clutched to said sleeves for common rotation therewith, a washer being interposed between adjacent sleeves, if desired, to provide for additional shoulders, said sleeves and said washer being mounted on the shaft in abutting relationship, each helical gear being thus journalled on a sleeve between a pair of shoulders provided for by said collars, or said washer respectively.

In the drawing an embodiment of the invention is represented.

Fig. 1 illustrates an axial section of a speed change transmission for motor vehicles having five speeds and provided with splined clutch members, a cross section of the splined driven shaft being shown inserted in the side view of such splined shaft, both toothed clutches being in neutral position;

Fig. 2 is a detail of Fig. 1 on an enlarged scale including one of the clutches shown in engaged condition;

Fig. 3 is a tangential longitudinal section of one of the external splines of the splined portion of a gear-carrying sleeve, said section being taken along the line 3—3 of Fig. 2.

The driven shaft 5 of the transmission is disposed co-axially with the driving shaft or motor shaft 6 and is journalled in the transmission casing 8 by a ball bearing 7, the reduced end of shaft 5 being journalled within an axial bore of the driving shaft 6 by means of anti-friction rollers 9, the driving shaft 6 being journalled in the transmission casing 8 by means of ball bearings 10. A secondary shaft 11 extending parallel to the shafts 5 and 6 is mounted in the transmission casing 8 by means of ball bearings 12 and 13 and is integral with helical gears 16, 17, 18, and 19. Between the ball bearing 12 and the gear 16 a member constituting helical gears 14 and 15 is keyed on shaft 11. The gear 14 is in permanent mesh with gear teeth 20 provided on the driving shaft 6 thus causing the secondary shaft 11 to be driven by the driving shaft 6 at a fixed ratio of rotation.

Motion is transmitted from the secondary shaft 11 to the driven shaft 5 selectively by any one of a plurality of pairs of gears operative when the transmission is set to first, second, third, or fourth gear respectively. When the transmission is shifted to first gear, a large gear 21 slidable on a splined section 25 of the driven shaft 5 for longitudinal shifting motion is shifted in the direction of the arrow 26 into mesh with the gear 19 of the secondary shaft 11. Each of the gears 22, 23 and 24 forming part of the other pairs of gears is rotatably mounted on a sleeve. Sleeve 28 carrying gear 23 and sleeve 29 carrying gear 24 have external splined collars 28$^a$ and 29$^a$ providing shoulders and are slidable on a splined section 30 of the driven shaft 5, and are suitably secured against axial displacement thereon by means to be described hereinafter including an annulus 31. The sleeve 28 abuts against a sleeve 27 which, in its turn, abuts against a shoulder 53 provided between the splined sections 30 and 25 of shaft 5. A washer 59 is interposed between the sleeves 29 and 28, and the sleeve 27 is provided with a collar 27$^a$ at its end. Thus it will be noted that the adjacent elements 27$^a$, 28$^a$, 59, 29$^a$, including the sleeves 27, 28 and 29 form shoulders, and that each of the gears 22, 23 and 24 is positioned between and detained in axial direction by two of said shoulders.

The sleeves 28 and 29 constitute the inner components of two toothed clutches adapted to connect the gears mounted thereon with the driven shaft 5 for common rotation therewith and, to this end, are provided with external splines 32 and 32$^a$ mounted in engagement with internal splines 33 and 33$^a$ of the outer components 34, 35 of such clutches. Each of the clutch members 34 and 35 is formed by an annulus having a peripheral groove 44 or 44' for engagement by a yoke 42, or 43 respectively.

Each of the two co-axially mounted spaced gears 22 and 23 has a hub provided with external clutch teeth 36, or 37 respectively, formed by splines on the projecting end of such hub, said splines having substantially the same diameter and the same profile as the splines 32 and being disposed adjacent thereto. Similarly, the gear 24 has a hub projecting towards the splined collar of sleeve 29 and provided with clutch teeth or splines 38 adjacent thereto. The end of shaft 6 has a flange provided with splines 39 adjacent to the end face of sleeve 29. From the above it will be evident that the clutch member 34, if shifted in the direction of the arrow 40 towards the right, will engage the clutch teeth 36 and will thus connect sleeve 28 with gear 22 for common rotation, whereas the clutch member 34, if shifted in the direction of the arrow 40' to the left, will engage the clutch teeth 37 to connect gear 23 with sleeve 28 for common rotation. Similarly, the clutch member 35 may be shifted from the neutral position shown in Fig. 1 to the right or left according to arrows 40$^a$ and 40'$^a$ into a position in which it engages the clutch teeth of either gear 24 or shaft 6. Since the gears 22, 23 and 24 are permanently meshing with the gears 18, 16, and 15 respectively, the latter being fixed to the secondary shaft 11, the transmission may be set to either one of the following conditions:

(a) By connecting gear 22 with the driven shaft 5 for common rotation, the transmission will be set to second gear, the ratio of reduction being somewhat smaller than with the setting of the transmission for first gear.

(b) By connecting the gear 23 with the driven shaft 5 for common rotation, the transmission will be set to third gear, the ratio of reduction being somewhat smaller than with the setting of the transmission for second gear.

(c) By connecting the gear 24 with the driven shaft 5 for common rotation, the transmission will be set to fourth gear, the ratio of transmission having its lowest value.

(d) By directly connecting the driving shaft 6 with the driven shaft 5 for common rotation, the transmission will be set to fifth gear, both shafts revolving in unison.

The pinion 17 provided on the secondary shaft 11 meshes with a gear not shown disposed in front of the plane of the section of the transmission illustrated in Fig. 1, such gear being mounted on a reverse shaft, the latter being adapted, when the transmission is shifted into reverse, to transfer the motion by means of another pinion not shown to the gear 22 and thus to the driven shaft 5.

The transmission is shifted to the desired gear condition by shifting yokes 41, 42 and 43 adapted to engage the annular grooves 44 and 44' of the clutch members 34, 35, and a groove 44" of the hub of gear 21 respectively, each yoke being slidably guided on one of a plurality of spaced adjacent rods 45 attached to the casing 8 of the transmission to extend parallel to the shafts 5, 6. A shifting member 46 mounted for optional motion by the driver transversely to the rods 45 for selective engagement with any one of the yokes 41, 42, 43 and for motion parallel to the rods 45, is shown in the drawing as engaging the yoke 42 adapted to shift the transmission from neutral to either the second gear condition or the third gear condition. In either position the yoke 42 is arrested by a detent ball 48 urged by a spring 47 into engagement with one of three recesses 49 provided in the respective rod 45. The bias of the detent spring 47 must not be excessive lest the manual gear shifting operation requires excessive physical effort.

Therefore, it is desirable in transmissions for transferring high power that additional means be provided preventing the clutches 34, 35, when in engaged position, from "walking out" of the clutch when torque is being applied. In the transmission shown I have provided such additional means in the following manner: Each of the external splines 32 of the clutch sleeves 28, 29 is formed with reduced ends and with a widened central section located between and contiguous with such ends. As shown in Fig. 3, the widened central section 51 forms a pair of stop shoulders 52 on either side face of the spline 32, such shoulder 52 being so curved as to provide for a smooth transition between the shoulder and the respective side face of the reduced end of the spline. Preferably, the widened central section 51 projects a distance of 0.2 to 0.3 millimeter out of the side faces of the reduced ends of the spline 32. When the clutch member 35, or 34 respectively, assumes its central neutral position shown in Fig. 1, it rides on the widened central sections 51 of the splines 32 being disengaged from the gears 20 and 24 or, more particularly, from the clutch teeth 39 and 38 thereof. From such neutral position shown in Fig. 1 the clutch member 35, and similarly the clutch member 34, may be shifted to either one of two positions in which it engages the adjacent gear clutch teeth of one of the gears 20, 24, and the adjacent ones of the reduced ends of the splines 32 abutting the stop shoulder 52 of the widened portion 51, as clearly shown in Fig. 2. As a result, the clutch members 34 and 35, when in engaged condition, will be prevented from "walking out" of engaged condition and from returning to neutral under the effect of axial thrust as long as such clutch members are subjected to a torque for the transfer of power either from the motor shaft 6 to the shaft 5 or, in coasting, inversely from shaft 5 to the motor shaft 6. When the engine is idling, however, no substantial torque being produced, the splines 33 of the clutch members 34, 35 will engage the splines 32 of the sleeves 28 and 29 without any substantial pressure and may be shifted from the Fig. 2 position to the Fig. 1 position without any great physical effort, as they will easily ride over the shoulders 52 when shifted by the coordinated yokes 42, or 43 respectively, to the neutral central position.

In the embodiment illustrated, the clutch composed of members 28 and 34 and the clutch composed of members 29 and 35 may be selectively shifted in either direction indicated by the arrows 40, 40', 40ª and 40'ª. The invention is equally applicable, however, to a clutch shiftable in one direction only. In such event, the widened portions 51 of the splines 32 need not be positioned between the ends of such splines.

The gears 14, 15, 16, 17, 18, 19, 20, 21, 22, 23, and 24 are preferably provided with helical teeth in order to enhance a smooth and noiseless meshing thereof. As a result, however, considerable axial thrust will be exerted on the gears including the gears 22, 23 and 24 mounted on the driven shaft 5 and adapted to operate at different speeds. It is highly undesirable that the axial thrust exerted upon a power-transmitting gear be transferred to the adjacent idling gear and to the bearings thereof as otherwise the gears might jam. Therefore, I have provided the sleeves 27, 28 and 29 with collars providing shoulders 27ª, 28ª and 29ª for engagement by the gears mounted thereon. Additional shoulders are provided by the interposed washer 59 having a larger diameter than the adjacent sleeves 28 and 29, all of the elements 27, 28, 59, and 29 being mounted on the driven shaft 5 in abutting relationship, each of the helical gears being mounted between a pair of shoulders provided in the manner described.

The washer 59, interposed between the sleeves 28 and 29, acts as an abutment for the gears 23 and 24. As seen in Figs. 1 and 2, gear 23 has an axial clearance 60 on sleeve 28. Similarly gear 22 has an axial clearance 62 on sleeve 27 and gear 24 an axial clearance 61 on sleeve 29. These clearances are defined between the shoulder of each sleeve and the spacing washer 59 or the adjacent shoulder. The purpose of the washer 59 is to prevent the transmission of axial thrust from the loaded gear to the next one, and for this purpose it is freely mounted on the shaft 5 but clamped between the sleeves 28 and 29. Thus it always acts as an abutment for the loaded gear, whereas the other, unloaded gear, by reason of its clearance 60 or 61 inherent to the construction, remains free of any influence due to thrust.

While the collar 27ª of sleeve 27 abuts against the shoulder 53 of the driven shaft 5, the sleeve 29 is held in position by a locking annulus 31 provided with internal splines adapted to engage the external splines 30. After the sleeves 27, 28, 29, the washer 59, and the gears 22, 23 and 24 have been mounted in position on shaft 5, the entire aggregate is firmly held against the shoulder 53 by the annulus 31 which is slipped on the shaft 5 into engagement with an internal shoulder 54 provided by a large bore 55 or sleeve 29. When slipped in such position, the annulus 31 may be turned half a pitch owing to the provision of a peripheral groove 56 intersecting the splines 30 of shaft 5. By such turn, the internal splines of the annulus 31 will be aligned with the splines 30 of shaft 5, whereupon a cylindrical radial pin 58 mounted in a radial bore of shaft 5 will be urged by a spring 57 in said bore into engagement with an internal recess of the annulus 31, thus detaining the same against accidental rotation in the groove 56. As the annulus 31 is now held against axial displacement by the engaging splines, it will secure the sleeves 27, 28 and 29 from axial displacement on shaft 5.

Owing to the provision and arrangement of the inner clutch members 28 and 29 as spacing sleeves, the axial thrusts produced by the helical teeth of the gears will be effectively taken up, and the transmission being composed of a minimum of elements lending themselves to cheap manufacture may be readily assembled in a simple manner on the main shaft 5 in such a way that their shoulders are closely touching one another and every gear between two collars of these bushes, respectively between one collar and the intermediate ring is arranged on the bushes. The whole set is then pressed firmly through the locking ring 31 against the shoulder 53 of the main shaft.

This locking ring is provided with an internal gearing corresponding to the key groove gearing 30 of shaft 5. After the transmission gears 22—24 with their bearing bushes and shifting clutches have been mounted on the main shaft, this is also arranged on it as the last part, and shifted forward until it touches closely the shoulder 54 of a bore 55 of the driving ring 29. In this position the locking ring can be turned about half a toothing in a ring groove 56 of the main shaft in such a way that the teeth of its internal gearing get in corresponding position to those of the key groove gearing of the main shaft, whereupon a cylindrical pin 58 under the effect of the spring 57 snaps into a space between the teeth of the locking ring and prevents this from further turning in the groove 56. Since the locking ring now can no longer move axially, the bushes 27—29 too are secured against an axial displacement on the main shaft.

By the described construction and arrangement of the driving rings in the way of distance bushes a clear and well defined reception of the axial forces produced by the helical gearing of the gears and at the same time a simple assembly of this transmission part under the use of few parts easily to be constructed, is obtained. The invention is not limited to the shown example, but can be varied ad libidum within the scope of the different ideas of the invention.

What I claim is:

1. In a transmission, the combination comprising two co-axially mounted spaced gears provided with external clutch teeth on their adjacent ends, an externally splined rotary member mounted between said gears co-axial therewith, the external splines of said member being formed with reduced ends and with a widened central section located between and contiguous with said ends and forming a pair of stop shoulders on either side face of said splines, and an internally splined clutch member mounted on and slidably engaging said rotary member, the internal splines of said clutch member having end surfaces and smooth sides, said clutch member being adapted to be shifted from a central neutral position in which it rides on said widened central section being disengaged from said gears to either one of two positions in which it engages said clutch teeth of one of said gears and the adjacent ones of said reduced ends of said external splines and with the end surfaces of the internal splines of said clutch member abutting said stop shoulders.

2. In a transmission, the combination comprising a shaft, a pair of sleeves mounted on said shaft in fixed relationship thereto, a spacing washer on said shaft between said sleeves having a larger external diameter than said sleeves, the remote ends of said sleeves being provided with shoulders of an external diameter greater than that of said sleeves, a pair of helical gears, each rotatably mounted on one of said sleeves between said washer and one of said shoulders with axial clearance, and clutch means mounted on one of said shoulders and adapted to selectively clutch said sleeves to said gears.

3. In a transmission, the combination comprising a shaft, a pair of sleeves fixed on said shaft, each of the remote ends of said sleeves being provided with an enlarged externally splined section, the external splines thereof being formed with reduced ends and with a widened portion contiguous with said ends and forming stop shoulders on the side faces of said splines, a spacing washer on said shaft between said sleeves having a larger external diameter than said sleeves, a pair of helical gears each rotatably mounted on one of said sleeves between said enlarged section thereof and said washer and provided with external clutch teeth adjacent to said section, and a pair of internally splined clutch members each mounted on and slidably engaging said externally splined section of the associated sleeve, the internal splines of said clutch members having end surfaces and smooth sides, each of said clutch members being adapted to be shifted from a neutral position in which it rides on said widened portion being disengaged from the adjacent one of said gears to a position in which it engages both the clutch teeth of the latter and said reduced ends of said external splines and with the end surfaces of the internal splines of said clutch member abutting said stop shoulders.

4. In a transmission, the combination comprising two co-axially mounted spaced gears provided with external clutch teeth on their adjacent ends, an externally splined rotary member mounted between said gears co-axial therewith, and an internally splined clutch member mounted on and slidably engaging said rotary member, the splines of one of said two splined members being formed with reduced ends and with a widened central section located between and contiguous with said ends and forming a pair of stop shoulders on either side face of said splines, and the splines of the other of said splined members having end faces and smooth sides, said internally splined clutch member being adapted to be shifted from a neutral position in which both splined members ride on one another by said widened central section being disengaged from said gears to either one of two positions in which it engages said clutch teeth of one of said gears and the external splines of said external splined member, both splined members being engaged by one of said reduced ends of the splines of one of said members and the end faces of the splines of the other member abutting said stop shoulders.

5. In a transmission, the combination comprising a shaft, a pair of sleeves mounted on said shaft in fixed relationship thereto, a helical gear rotatably mounted on each of said sleeves, abutment means on said shaft clamped between said sleeves on said shaft and extending radially from said shaft to limit axial movement of said gears on said sleeves, a shoulder on each said sleeve limiting axial movement of the respective gear in a direction away from said abutment means, and clutch means for selectively engaging said sleeves with said gears for rotation in unison therewith and with said shaft.

6. In a transmission, the combination comprising a shaft, a pair of sleeves mounted on said shaft in fixed relationship thereto, a spacing washer on said shaft between said sleeves having a larger external diameter than said sleeves, the remote ends of said sleeves being provided with shoulders of an external diameter greater than that of said sleeves, a pair of helical gears, each rotatably mounted on one of said sleeves between said washer and one of said shoulders, and clutch means mounted on one of said shoulders and adapted to selectively clutch said sleeves to said gears.

References Cited in the file of this patent

UNITED STATES PATENTS

| 2,053,542 | Vandervoort | Sept. 8, 1936 |
| 2,070,140 | Peterson | Feb. 9, 1937 |
| 2,246,636 | Peterson | June 24, 1941 |
| 2,397,620 | Orr | Apr. 2, 1946 |
| 2,615,346 | Simpson et al. | Oct. 28, 1952 |
| 2,662,800 | Hoffman | Dec. 15, 1953 |

FOREIGN PATENTS

| 421,864 | Great Britain | Jan. 1, 1935 |